(12) United States Patent
Jin et al.

(10) Patent No.: US 10,979,693 B2
(45) Date of Patent: Apr. 13, 2021

(54) STEREOSCOPIC 3D CAMERA FOR VIRTUAL REALITY EXPERIENCE

(71) Applicant: Lucid VR, Inc., Santa Clara, CA (US)

(72) Inventors: Han Xiong Jin, Sunnyvale, CA (US); Adam Rowell, Sunnyvale, CA (US)

(\*) Notice: Subject to any disclaimer, the term of this patent is extended or adjusted under 35 U.S.C. 154(b) by 117 days.

(21) Appl. No.: 15/908,692

(22) Filed: Feb. 28, 2018

(65) Prior Publication Data

US 2018/0192034 A1    Jul. 5, 2018

Related U.S. Application Data

(63) Continuation of application No. 15/143,443, filed on Apr. 29, 2016, now Pat. No. 9,930,315.

(60) Provisional application No. 62/154,703, filed on Apr. 29, 2015.

(51) Int. Cl.

| | |
|---|---|
| *G06T 7/80* | (2017.01) |
| *H04N 5/232* | (2006.01) |
| *H04N 13/246* | (2018.01) |
| *H04N 13/117* | (2018.01) |
| *H04N 13/189* | (2018.01) |
| *H04N 13/178* | (2018.01) |
| *H04N 13/296* | (2018.01) |
| *H04N 5/77* | (2006.01) |
| *H04N 5/907* | (2006.01) |
| *H04N 9/82* | (2006.01) |
| *H04N 13/239* | (2018.01) |
| *H04N 9/87* | (2006.01) |

(52) U.S. Cl.
CPC .......... *H04N 13/246* (2018.05); *G06T 7/85* (2017.01); *H04N 5/23238* (2013.01); *H04N 5/23267* (2013.01); *H04N 5/772* (2013.01); *H04N 5/907* (2013.01); *H04N 9/8205* (2013.01); *H04N 9/8227* (2013.01); *H04N 9/8715* (2013.01); *H04N 13/117* (2018.05); *H04N 13/178* (2018.05); *H04N 13/189* (2018.05); *H04N 13/239* (2018.05); *H04N 13/296* (2018.05)

(58) Field of Classification Search
CPC ..... H04N 13/246; H04N 5/23238; G06T 7/85
See application file for complete search history.

(56) References Cited

U.S. PATENT DOCUMENTS

| 9,451,166 | B1* | 9/2016 | Ribardo, Jr. ......... H04N 17/002 |
|---|---|---|---|
| 9,930,315 | B2 | 3/2018 | Jin et al. |
| 9,948,919 | B2 | 4/2018 | Jin et al. |
| 2006/0028489 | A1 | 2/2006 | Uyttendaele et al. |
| 2006/0093239 | A1 | 5/2006 | Kakinami |
| 2011/0141349 | A1* | 6/2011 | Albuz ..................... H04N 5/145 |
| | | | 348/441 |
| 2012/0075435 | A1 | 3/2012 | Hovanky et al. |
| 2013/0120224 | A1 | 5/2013 | Cajigas et al. |

(Continued)

OTHER PUBLICATIONS

Non-Final Office Action dated Aug. 16, 2017 in U.S. Appl. No. 15/143,443 of Jin, H. et al. filed Apr. 29, 2016.

(Continued)

*Primary Examiner* — Rowina J Cattungal

(57) ABSTRACT

Embodiments are disclosed for a stereoscopic device (also referred to simply as the "device") that captures three-dimensional (3D) images and videos with a wide field of view and provides a virtual reality (VR) experience by immersing a user in a simulated environment using the captured 3D images or videos.

11 Claims, 12 Drawing Sheets

(56) References Cited

U.S. PATENT DOCUMENTS

| | | |
|---|---|---|
| 2013/0124471 A1* | 5/2013 | Chen .................. H04N 5/247 |
| | | 707/624 |
| 2013/0210523 A1 | 8/2013 | Arumugam et al. |
| 2015/0049946 A1 | 2/2015 | Madineni et al. |
| 2015/0062292 A1 | 3/2015 | Kweon |
| 2015/0109509 A1 | 4/2015 | Di Federico et al. |
| 2015/0172544 A1 | 6/2015 | Deng et al. |
| 2015/0254818 A1 | 9/2015 | Li et al. |
| 2016/0065947 A1 | 3/2016 | Cole et al. |
| 2016/0253795 A1* | 9/2016 | Cole .................. H04N 13/232 |
| | | 345/426 |
| 2016/0255327 A1 | 9/2016 | Cole et al. |
| 2016/0323560 A1 | 11/2016 | Jin et al. |
| 2016/0323561 A1 | 11/2016 | Jin et al. |

OTHER PUBLICATIONS

Non-Final Office Action dated Aug. 30, 2017 in U.S. Appl. No. 15/179,056 of Jin, H. et al. filed Jun. 10, 2016.
Non-Final Office Action dated Dec. 16, 2016 in U.S. Appl. No. 15/179,056 of Jin, H. et al. filed Jun. 10, 2016.
Non-Final Office Action dated Jan. 26, 2017 in U.S. Appl. No. 15/143,443 of Jin, H. et al. filed Apr. 29, 2016.
Notice of Allowance dated Dec. 8, 2017 for U.S. Appl. No. 15/179,056 of Jin, H. et al. filed Jun. 10, 2016.
Notice of Allowance dated Nov. 8, 2017 for U.S. Appl. No. 15/143,443 of Jin, H. et al. filed Apr. 29, 2016.
Restriction Requirement dated Sep. 8, 2016 in U.S. Appl. No. 15/179,056 of Jin, H. et al. filed Jun. 10, 2016.
U.S. Appl. No. 15/920,160 of Jin, H.X., filed Mar. 13, 2018.

* cited by examiner

STEREOSCOPIC 3D CAMERA FOR VIRTUAL REALITY EXPERIENCE

CROSS REFERENCE TO RELATED APPLICATIONS

This application is a continuation application of U.S. patent application Ser. No. 15/143,443 entitled "STEREOSCOPIC 3D CAMERA FOR VIRTUAL REALITY EXPERIENCE," filed Apr. 29, 2016, which claims priority to U.S. Provisional Application No. 62/154,703 entitled "STEREOSCOPIC CAMERA CAPTURING 180-DEGREE 3D IMAGES AND VIDEOS," filed Apr. 29, 2015, both of which are incorporated by reference herein in their entirety.

BACKGROUND

Virtual reality (VR) is a computer technology that simulates an environment in a way that allows a user to interact with the simulated environment. Virtual reality can replicates different sensory experience, e.g., sight, touch, hearing or smell. Some virtual realities focusing on visual experience are displayed on a computer screen or with a virtual reality headset (also referred to as head mounted display or HMD). The virtual reality immersive environment can be simulated in way close to the real world experience in order to replicate a lifelike experience.

DETAILED DESCRIPTION

Figure 1:
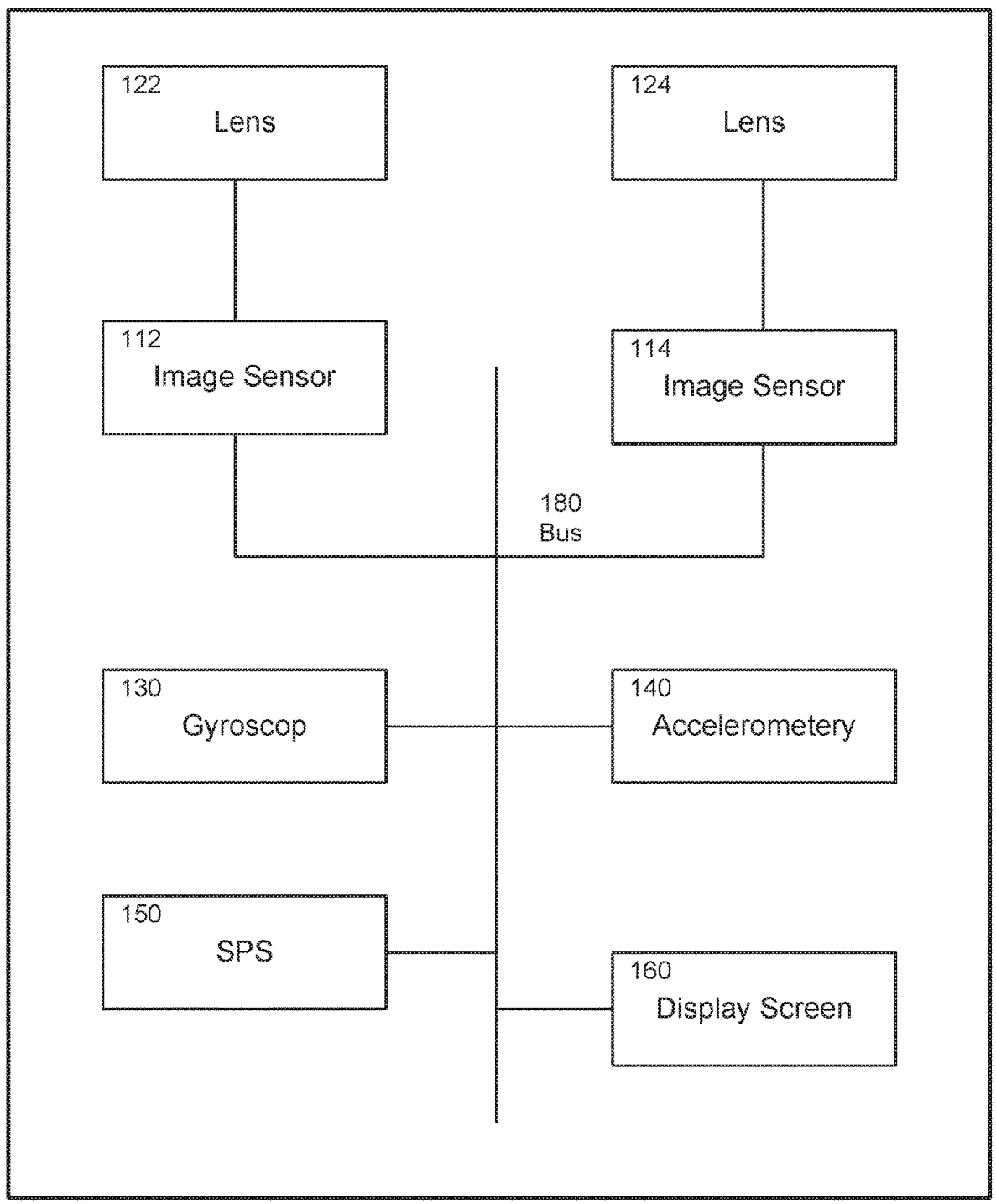
FIG. 1 is a block diagram showing components of a stereoscopic 3D video camera that can record 3D videos and embed 3D calibration metadata.

The disclosed embodiments disclose a stereoscopic device (also referred to simply as the "device") that captures three-dimensional (3D) images and videos with a wide field of view and provides a virtual reality (VR) experience by immersing a user in a simulated environment using the captured 3D images or videos.

In some embodiments, the stereoscopic device includes two wide-angle lenses (e.g., fish-eye lenses) to captures 3d images and videos with a wide field of view. For example, the field of view can be, e.g., 180 degrees. The two wide-angle lenses can be spaced apart at a distance similar to the distance between the human eyes.

The stereoscopic device can include two digital image sensors that capture images based on light transmitted through the two wide-angle lenses. Each image sensor is mounted behind one of the wide-angle lenses. The digital image sensors can be, e.g., charge-coupled devices (2Ds) or complementary metal-oxide-semiconductor (CMOS) devices that converts the light signals into digital data. The wide-angle lenses and the digital image sensors can simultaneously capture images or video streams from two different perspectives, each with a wide field of view (e.g., 180 degrees).

The stereoscopic device can further include a storage device for storing the digital data of the captured images and videos (also referred to image data and video data). For example, the storage device can be, e.g., a flash memory.

The stereoscopic device can include one or more data interfaces for communicating with external devices. For example, the stereoscopic device can include a USB interface that is capable of connecting to an external device (e.g., a laptop, an external hard drive, a tablet, a smart phone) for transmitting the video data or video data to the external device.

The stereoscopic device itself can further function as a virtual reality headset. The device includes a display screen for playing back the captured 3D images or 3D video. The device can further include a motion sensor (e.g., an accelerometer, or an inertial measurement unit, as referred to as IMU) for determining head position and orientation of a user who wears the stereoscopic device as a virtual reality headset. The shape of the stereoscopic device is designed to be fit into a head mount device. The head mount device is for attaching the stereoscopic device on the head of the user such that the user's eyes are in front of the left and right portions of the display screen respectively.

The device simultaneously records two videos from two different perspectives using the two digital image sensors. Because of the wide-angle lenses, the videos are captured with a wide field of views (FOVs), e.g., 180 degrees. Such a field of view is wider than the field of view of human eyes. For example, humans' binocular visions typically have a field of view of 114 degrees (horizontally). During playing back as a virtual reality headset, the stereoscopic device determines the head position and orientation and only plays back a cropped portion of the captured 3D images or videos. The sizes and locations of the cropping windows depends on the detected head position an orientation, as well as the human field of view.

The device plays back the cropped 3D images or videos with a narrower field of view on the left and right portions of the display screen. The left eye of the user is in front of the left portion of the display screen, and views the left channel of the cropped 3D images or videos. Similarly, the right eye of the user is in front of the right portion of the display, and views the right channel of the cropped 3D images or videos. Because the left and right channels of the 3D images or videos were captured at two different perspectives, the user experiences a stereoscopic 3D effect.

When the user moves the head to a different position or orientation, the motion sensor detects the movement. Based on the new head position or orientation, the device determines new positions (or new sizes as well) of the cropping windows and generates in real time the cropped 3D images or videos. Therefore, the field of view experienced by the user eyes changes correspondingly as the user moves the head. Thus, the user is immersed in a virtual reality created based on the 3D images or videos.

In this way, the user can move the head to look freely in different directions at different parts of the 3D image or 3D video within the wide field of view (e.g. 180 degrees). Because the field of view of the captured 3D image or 3D video (prior to cropping) is larger than the field of view of the human vision, the user experiences a sense of presence in a virtual environment created based on the captured 3D image or 3D video. In other words, the 3D image or video provide the user a realistic illusion of being immersed into the image or video.

In some embodiments, the stereoscopic device does not need to combine the left and right channels of the 3D image or 3D video into a single channel, since the two channels are shown separately to the left and right eyes of the user. In some other embodiments, the left and right channels of the 3D image or 3D video can be stitched together to form a single feed of image or video such that there is no visible seam between the left and right portions of the display screen when the device plays back the 3D image or 3D video.

In some embodiments, multiple stereoscopic devices can be combined together to capture the 3D image or 3D video in a super wide field of view (e.g., 360 degrees). For example, three stereoscopic devices can be mounted on a 360 rig mount such the three stereoscopic devices are facing three different directions. The 3D images or 3D videos captured by the stereoscopic devices can be stitched together to create a 360-degree virtual reality experience. For example, when a user moves the head at any orientation with the 360 degrees, the device in real time plays back a cropped portion of the 360-degree stitched 3D videos based on the head orientation and human vision field of view. Therefore, the user can experience a sense of presence in a 360-degree virtual environment based on the 360-degree 3D image or 3D video captured simultaneously by the three stereoscopic devices.

Stereoscopic 3D Calibration for VR

Other than the different perspectives, human eyes are very sensitive to any differences between the left and right eye visions. When there is a noticeable difference in distortions between the left and right channels of the 3D video, the stereoscopic 3D effect experienced by the user is significantly suppressed. During the manufacturing processes of the wide-angle lenses, digital image sensors, and the stereoscopic device, various types of manufacturing variances can be introduced.

For example, the distance between the left wide-angle lens and the left image sensor may be slightly shorter than the distance between the right wide-angle lens and the right image sensor. Alternatively, due to the manufacturing variance of the wide-angle lenses, the left wide-angle lens may have an optical distortion profile that is slightly different from the optical distortion profile of the right wide-angle lens.

In order to enhance the stereoscopic 3D effect, it is desirable to eliminate the optical distortion difference between the left and right channels of the 3D video due to the manufacturing variances. After the stereoscopic device is manufactured, the device, including the wide-angle lens and the image sensors, can be tested through a calibration process to detect the distortion differences between the left and right channels. The distortion differences are recorded as 3D calibration data. Using the 3D calibration data, the captured 3D videos can be played back with a compensation based on the 3D calibration data.

In some embodiments, the 3D calibration data can be embedding into the 3D videos as metadata. For example, the stereoscopic device captures the 3D video into a recorded 3D video file and embeds the 3D calibration data into the 3D video file as metadata. These metadata can include, e.g., camera intrinsic parameters, parameters of each of the left and right wide-angle lenses, parameters of each of the left and right image sensors, information about the inertial measurement unit (IMU), information about the accelerator, information about the gyroscopic device, information of the device location, etc.

Some of the 3D calibration metadata can be saved in the metadata header of the 3D video file. Some of the 3D calibration metadata can be encoded into one or more frames of the 3D video file via, e.g., a video steganography process. In some embodiments, a graphic processing unit (GPU) can perform the video steganography process.

During playback of the 3D video file, a playback device (e.g., a stereoscopic device disclosed or another device such as a computer or a smart phone) can extract the 3D calibration metadata from the 3D video file. For example, the metadata can be, e.g., extracted from the metadata header of the video file, or decoded from one or more frames of the video though a video steganography technique, when the video is being processed by a stereoscopic video player running on the playback device.

FIG. 1 is a block diagram showing components of a stereoscopic 3D video camera that can record 3D videos and embed 3D calibration metadata. As shown in FIG. 1, a stereoscopic 3D video camera 100 includes two or more image sensors 112 and 114 fitted with one lens (122 and 124) per sensor. Each of the image sensors 112, 114 and lenses 122, 124 have associated parameters, such as the sensor size and resolution, the lens focal lengths, and lens distortion parameters. The parameters of each image sensor and lens may be unique, and are often determined through a stereoscopic camera calibration process. Additionally, the camera 100 may have additional sensors, such as a gyroscope 130, accelerometer 140, or GPS device 150 to record information related to the movement or position of the camera 100. The electrical components of the camera 100 are interconnected by a bus 190.

During the video capturing process, the image sensors 112, 114 record video frames, and the stereoscopic camera 100 combines the frames from the individual image sensors 112, 114 into a composite video file. In some embodiments, the composite video file includes two channels of video streams, for left and right eyes respectively. The video frames may be processed prior to being encoded into the video file, with additional image processing parameters describing the processing.

To play back a stereoscopic 3D video, a stereoscopic video player is necessary, such as a virtual reality ("VR") headset or a mobile phone fitted with a stereoscopic display adapter. In some embodiments, the functionalities and components of the stereoscopic video player can be combined to the stereoscopic 3D video camera 100 as well. For example, the camera 100 can include a display screen 160 for playing back the 3D videos.

Each of the stereoscopic frames is processed by the player, which may additionally require the parameters associated with the camera 100 that captured the frames. For example, the player may require knowing the camera's image sensor and calibration parameters to properly render the stereoscopic frames. If the video frames were processed by the camera prior to being encoded into the video file, the play may also need to know the parameters of the image processing algorithms that processed the frames.

It is desirable to embed the parameters about the camera, sensor, and processing directly into the video file recorded by the stereoscopic camera at the time of capture. Some of these parameters may be fixed for the duration of the video, such as image sensor and calibration parameters; while some parameters may change during the recording process, such as accelerometer, gyroscope, and GPS sensor readings.

In some embodiments, it is desirable that a player can read and process a video file that has been generated using the captured video of different stereoscopic cameras. For example, two users with different stereoscopic cameras may record scenes with their own devices, and then concatenate their respective videos into a single video file. In such a case, the stereoscopic video player will need to be able to associate different portions of the composite video file with different camera parameters, including different lens distortion parameters and image sensor parameters.

Accordingly, there is a need for a system or method that can embed the camera and sensor parameters into the video file captured by a stereoscopic 3D camera. Parameters will be either set once per the entirety of the file, or changed for each frame of the video. Additionally, there is a need for a system or method that can process such a stereoscopic 3D video file and decode the parameters, either fixed for the entirety of the file, or on a per frame basis. Such a system or method could then utilize the parameters during the playback of the video file.

Although generally the 3D calibration metadata for a particular stereoscopic device does not change after the device is manufactured and calibrated. However, the stereoscopic device may need re-calibration in some situations. For example, if the stereoscopic device is dropped to the ground. The distance between a lens and the image sensor behind the lens may be slightly changed. The stereoscopic device can perform a re-calibration process to re-capture the new 3D calibration metadata.

In some embodiments, the stereoscopic device can re-calibrates itself when the device is capturing a 3D video. Using the content of the 3D video, including the differences between the left and right channels, the stereoscopic device can establish new 3D calibration parameters. For example, a certain object in the video with a sharply contrasted portions may act like a contrast-level calibration reference object for the stereoscopic device to conduct the automatic re-calibration. Alternatively, an object in the video may be known as have a rectangular shape, but appears to be curved due to the distortion. The stereoscopic device then can re-calibrate the distortion metadata by detecting the level of distortion on the curved image of the object. The re-calibrated 3D calibration metadata may be transmitted to the playback device in a real time, when the playback device replays the 3D video as the stereoscopic device captures the 3D video.

Figure 2:
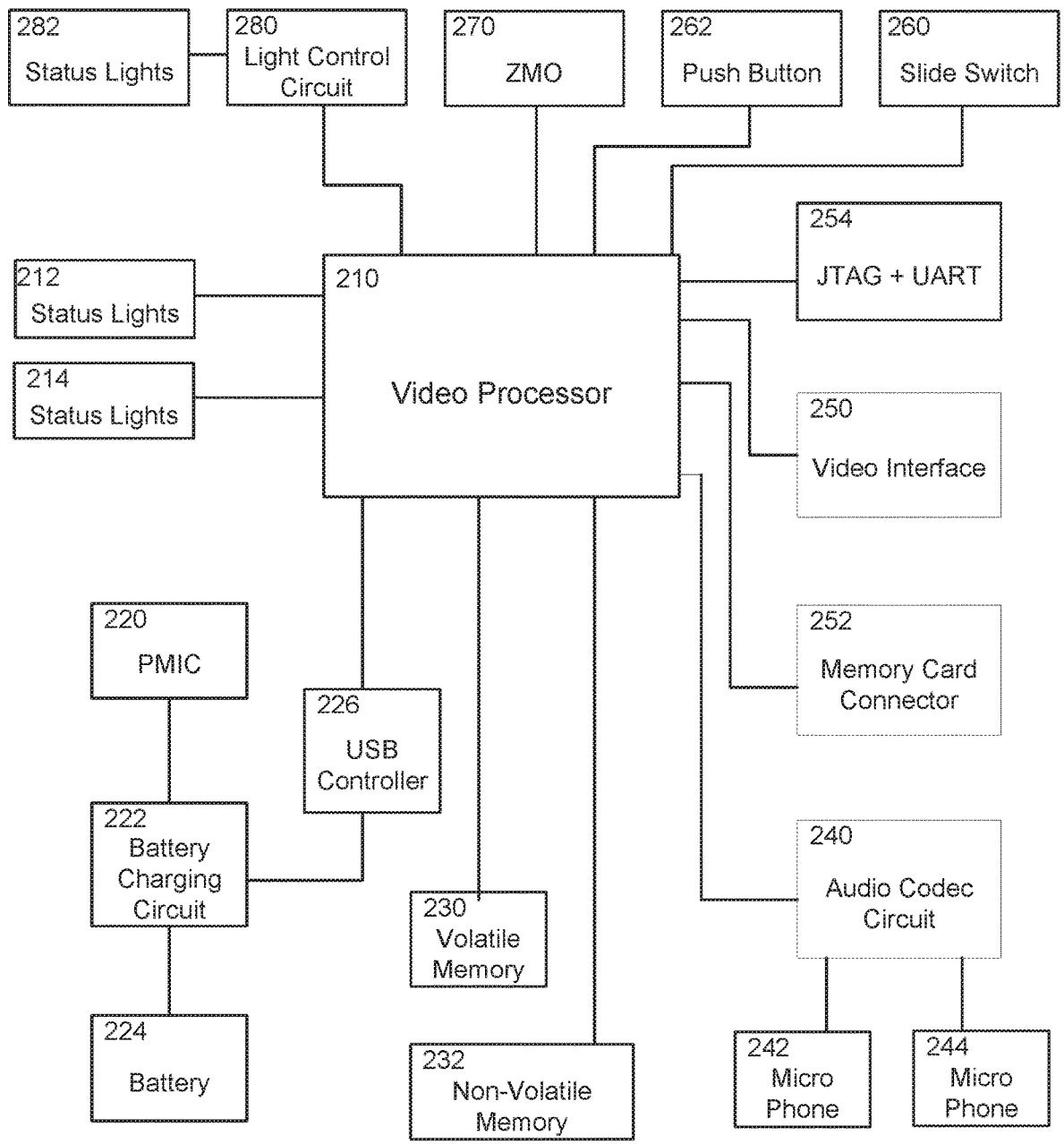
FIG. 2 is a block diagram showing various components of a sample stereoscopic device.

The stereoscopic device can include various types of components. FIG. 2 is a block diagram showing various components of a sample stereoscopic device. The stereoscopic device 200 includes a video processor 210 for processing various data collected by different components. The video processor 210 receives captured image data from image sensors 212 and 214.

A power management integrated circuit (PMIC) 220 is responsible for controlling a battery charging circuit 222 to charge a battery 224. The battery 224 supplied electrical energy for running the stereoscopic device 200. The video processor 210 can be connected to an external device via a USB controller 226. In some embodiments, the battery charging circuit 222 receives external electrical energy via the USB controller 226 for charging the battery 224.

The stereoscopic device 200 includes a volatile memory 230 (e.g. double data rate memory or 4R memory) and a non-volatile memory 232 (e.g., embedded MMC or eMMC, solid-state drive or SSD, etc.). The video processor 210 can also control an audio codec circuit 240, which collects audio signals from microphone 242 and microphone 244 for stereo sound recording.

The stereoscopic device 200 can include additional components to communicate with external devices. For example, the video processor 210 can be connected to a video interface 250 (e.g., high-definition multimedia interface or HDMI) for sending video signals to an external device. The device 200 can further include an interface 254 conforming to Joint Test Action Group (JTAG) standard and Universal Asynchronous Receiver/Transmitter (UART) standard.

The stereoscopic device 200 can include a memory card connector 252 to accommodate a memory card for providing additional storage space. The device 200 can further include a slide switch 260 and a push button 262 for operating the device 200. For example, a user may turn on or off the device 200 by pressing the push button 262. The user may switch between different modes (e.g., image capturing, video capturing, 3D capturing) using the slide switch 260.

The device 200 can include an inertial measurement unit (IMU) 270 for detecting orientation and/or motion of the device 200. The video processor 210 can further control a light control circuit 280 for controlling the status lights 282. The status lights 282 can include, e.g., multiple light-emitting diodes (LEDs) in different colors for showing various status of the device 200.

Stereoscopic 3D 360-Degree Stitching

In some embodiments, multiple stereoscopic devices can be combined together to capture the 3D image or 3D video in a super wide field of view (e.g., 360 degrees) simultaneously. Those simultaneously captured 3D videos can be combined together to create a virtual reality experience in 360 degrees. Thus, multiple sets of 3D calibration metadata need to be embedded into the combined 3D videos. Each set of the 3D calibration metadata corresponds to a channel of a 3D video captured by a pair of a wide-angle lens and an image sensor within a stereoscopic device.

Figure 3:
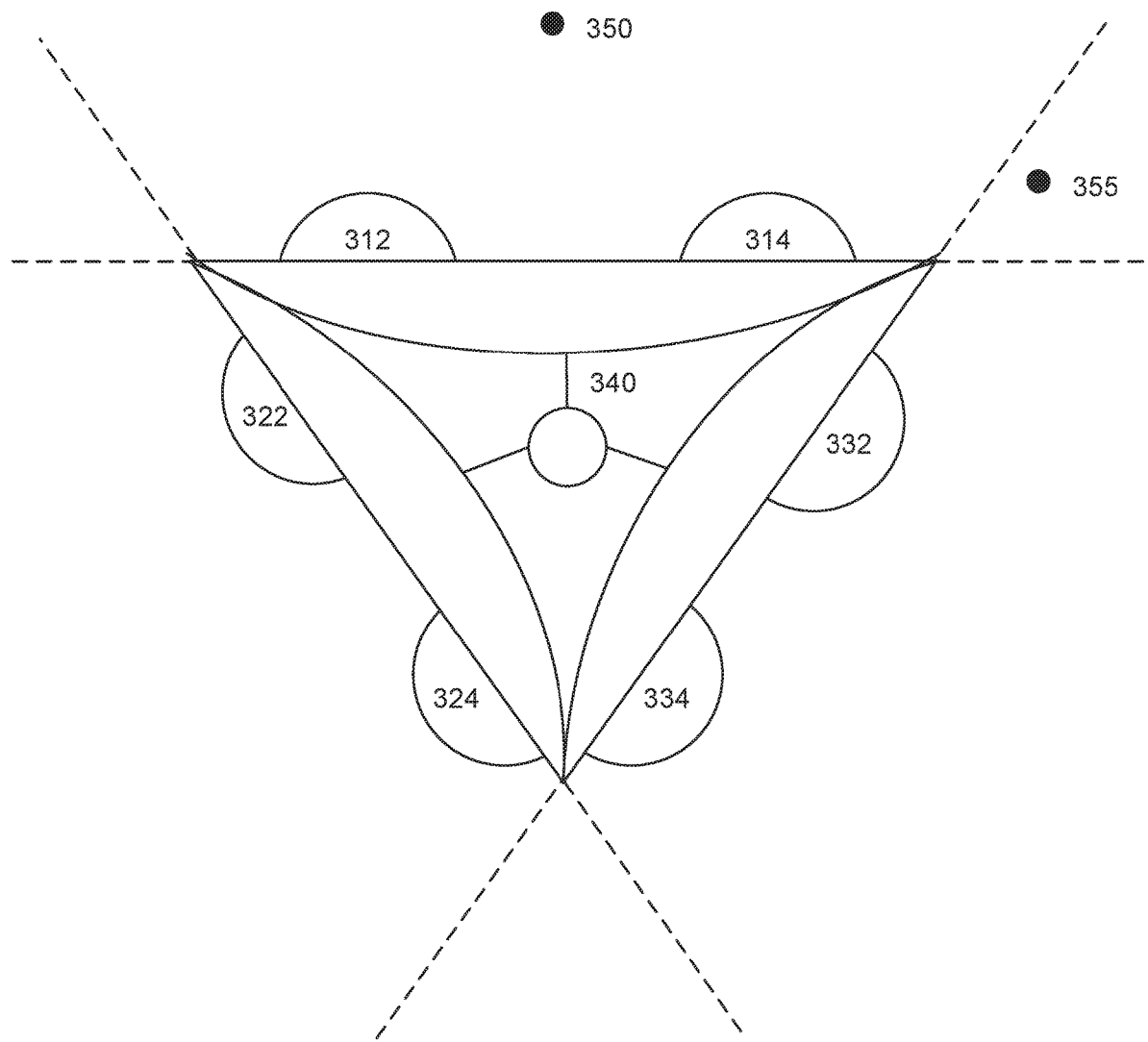
FIG. 3 shows multiple stereoscopic devices for capturing 3D videos from different directions simultaneously.

FIG. 3 shows multiple stereoscopic devices for capturing 3D videos from different directions simultaneously. Each of the stereoscopic devices 310, 320, 330 has a field of view of, e.g., 180 degrees. By combining the 3D videos captured by the three devices (totally 6 channels), a virtual reality of 360 degrees can be recreated.

During video capturing, three stereoscopic devices 310, 320, 330 can be mounted on a 360 rig mount 340 such the three stereoscopic devices 310, 320, 330 are facing three different directions. The 3D images or 3D videos captured by the lenses 312, 314, 322, 324, 332, 334 of the stereoscopic devices 310, 320, 330 can be stitched together to create a 360-degree virtual reality experience. For example, when a user moves the head at any orientation with the 360 degrees, the device in real time plays back a cropped portion of the 360-degree stitched 3D videos based on the head orientation and human vision field of view. Therefore, the user can experience a sense of presence in a 360-degree virtual environment based on the 360-degree 3D image or 3D video captured simultaneously by the three stereoscopic devices.

During the playback, depending on the orientation of the user head, the playback device might use multiple channels from one or more stereoscopic device to general in real time the left and right playback videos. Thus, the playback device switches in real time between different sets of 3D calibration metadata, depending on the channels it currently uses for generating the playback videos. In some embodiments, the calibration using the 3D calibration metadata is performed on a frame-by-frame basis. Therefore, the 3D calibration metadata needs to be extracted in a real time in order to switch between the sets of 3D calibration metadata in real time.

For example, at a first time point during the playback of the combined 3D videos, the user head is pointing toward a direction corresponding to the point 350 as illustrated in FIG. 3. The playback device determines that at the first time point, only the left and right channels of the 3D video captured by the device 310 is need in order to achieve the binocular stereoscopic effect and play back the current 3D VR videos for the eyes of the user. In other words, the device needs the 3D calibration metadata that relate to the device 310, including the lenses 312 and 314.

At a second time point during the playback of the combined 3D videos, the user head is pointing toward a direction corresponding to the point 355 as illustrated in FIG. 3. This time, the playback device determines that at the second time point, the device needs the right channel of the 3D video captured by the device 310 and the left channel of the 3D video captured by the device 330, in order to play back the current 3D VR videos for both eyes of user. In other words, the playback device leverages different reference points (with different perspectives) from lenses from different stereoscopic devices to achieve the binocular stereoscopic effect.

Thus, at the second time point, the device needs the 3D calibration metadata that relate to the device 310 (including the lens 314), as well as the 3D calibration metadata that relate to the device 330 (including the lens 332). Therefore, the playback device needs to switch between different sets of 3D calibration metadata in real time, depending on the 3D video channels on which the device currently relies for playing back the 3D VR video for the user.

The 3D effect at the point 355 might be less than the 3D effect at the point 50, because of the different perspectives of lenses and the fields of view. However, generally human eyes do not notice the diminishing 3D effect. This is because human eyes themselves have less 3D perception for the peripheral visions. Therefore, humans are used to the facts that areas of peripheral visions generally have less stereoscopic 3D effects.

Although FIG. 3 shows three devices, the technology can be applied to an arbitrary number of stereoscopic devices. For example, two stereoscopic devices with 180 degrees can be used to recreate a 360-degree virtual reality experience, using the technology disclosed herein.

Although FIG. 3 shows multiple devices for recording a combined 3D video for a field of view of 360 degrees, in some embodiments, the 3D effect of a field of view of 360 degrees can be achieved by a panoramic scan using a stereoscopic device. For example, a user can use the stereoscopic device to capture a continuous sequences of stereoscopic 3D images by a panoramic scanning motion. By stitching the continuous sequences of stereoscopic 3D images together, a playback device can recreate a 3D image with a field of view of 360 degrees.

Stereoscopic Video Stabilization at Playback Time

A playback device for playing back the 3D stereoscopic videos can adjust the orientation of captured stereoscopic video in a real time as the video is being rendered by a stereoscopic video player. The playback device can be, e.g., a stereoscopic device as disclosed, a mobile phone or a tablet.

During the stereoscopic video capturing process, the capturing device may not be stationary. The capturing device can introduce unwanted, apparent rotations or horizontal or vertical movement when capturing the scene. The playback device adjusts the captured video frame sequence in such a manner to correct, or stabilize, the scene for the user of the playback device.

In some embodiments, the playback device displays stereoscopic video captured via a stereoscopic camera. The video includes a captured stereoscopic video sequence of images. The playback device further processes the stereoscopic video frames during playback to identify, based on comparison of portions of the captured frame to other frames in the video sequence, data to stabilize the stereoscopic video sequence. Then the playback device performs video stabilization on portions of the captured stereoscopic video sequence. Such a stabilization is computed using one or both components of the stereoscopic frames, and the stabilization is applied to both components of each stereoscopic frame. After stabilization, frame images of each of the two 3D channels of the adjusted stereoscopic video sequence can be further cropped.

The playback device can use, e.g., a GPU for processing the video stabilization. The stereoscopic video sequence may be recorded by, e.g., a 3D stereoscopic camera with a field of view of approximately 180 degrees. The playback device can be a virtual reality headset for displaying the stereoscopic video content. The stereoscopic video stabilization algorithm is dependent on the orientation of the virtual reality headset. The stabilization can be focused on, e.g., the center of the portion of the image at which virtual reality headset is oriented.

In some embodiments, the stereoscopic camera that recorded the stereoscopic video sequence includes fish-eye lenses. The playback device then stabilizes the rotation of the stereoscopic video sequence on the captured fisheye images. The playback device further unwarps the video sequence into a rectilinear mapping, and further stabilizes the video sequence in the rectilinear space by stabilizing translation and additional rotational components.

In addition to the captured stereoscopic video sequence, the stereoscopic camera can further capture additional metadata and transmit the metadata to the playback device. The metadata can include, e.g., inertial measurement data from an accelerometer or a gyroscope. The video stabilization algorithm can use the additional metadata to improve the accuracy or precision of the perceived stabilization.

Stereoscopic Video Stabilization at Recording Time

The stereoscopic device for recording the stereoscopic video can include two image sensors and two lenses. The video frames captured from each sensor are combined and stored to form a stereoscopic video image. The stereoscopic device captures a video sequence having a plurality of such sequential stereoscopic images, and estimates unwanted motion of the video capture device for each of sequential stereoscopic images based on the motion data.

During the estimation, the device can determine rotational information for each of sequential images based on the motion data for one or more successive images in the sequential images. The steps of estimating the unwanted motion can includes, e.g., identifying a motion of the video capture device based on a first specified number of images from the plurality of sequential images captured before the specified image and a second specified number of images from the plurality of sequential images captured after the specified image; filtering the identified motion of the video capture device to generate a filtered motion, the filtered motion having a value corresponding to the specified image; and determining the difference between the value of the filtered motion corresponding to the specified image and a location of the specified image based on the motion data.

In some embodiments, for each of the sequential images, the device estimates the intrinsic data of the device by calculating a corresponding first matrix representing a projection of a point of the mapping. Each first matrix is calculated using at least one of a focal length of the video capture device at a time the image was captured and a principal point of the video capture device. Each item of intrinsic data represents a mapping from a three-dimensional space to a two-dimensional space associated with a plane of the video capture device in the absence of motion, and wherein a respective item of intrinsic data is estimated for each of the plurality of sequential images;

The device further modifies the sequential images by: calculating, for each of the plurality of sequential images, a second matrix as an inverse of the image's first matrix; and combining each first matrix together with its corresponding second matrix and a third matrix representing the estimated unwanted motion in a matrix operation applied to a respective image. Each matrix operation outputs one of the modified plurality of sequential images.

In other words, the device applies a transform to each of the sequential images to substantially remove the estimated unwanted motion. The transform applied to each of the sequential images is based on each image's image capture parameter values and motion information. The transform includes applying the intrinsic data to respective images. The device then stores each of the transformed plurality of sequential images in a memory.

The motion data for the sequential images can be captured at approximately the same time as the sequential images are captured. The motion data can include, e.g., gyroscopic sensor data representing motion in more than one direction, or acceleration data generated by an accelerometer sensor.

In some embodiments, the image or video capture device can be a portable electronic device. The device can further capture additional parameters, e.g., parameters representing a field of view of the video capture device, parameters representing a setting of a lens on the video capture device, parameters representing a setting of an image sensor assembly on the video capture device, etc. Each of the sequential images is associated with an image capture parameter values that may change based on settings of the video capture device.

Stereoscopic 3D High Dynamic Range (HDR) Optimization

A stereoscopic device includes two sets of wide-angle lenses and image sensor for independently capturing the left and right channels of the stereoscopic 3D video. In some embodiments, the exposure levels, white balances and color contrasts of those two left and right channels of the stereoscopic 3D video can be different. Therefore, before playing back the 3D video, the playback device needs to align the exposure levels, white balances and color contrasts of those two left and right channels with each other, so there is no disparity between those two channels when the user perceives the 3D video.

In some embodiments, the playback device conducts an HDR color correction in a real time when the user is looking through the virtual reality headset. For example, when a stereoscopic device records a 3D outdoor video, the video frame can contain images of the sun. The light directly from the sun can wash out the video frames. Furthermore, because of the different perspectives of the two wide-angle lenses, the levels of the wash-out effects can be different for the video frames of the left and right channels. The playback may use the GPU do conduct a real-time HDR color correction to reduce or eliminate the wash-out effects.

The result of the HDR optimization is a 3D video with the left and right channels that have the same exposure level, the same white balance and the same color contrast. Even though the 3D video may not be recorded using a HDR device, the optimized 3D video has a high dynamic range that is synchronized between the left and right channels and is not washed out by various light sources such as the sun.

Hardware Specification of Lenses

In some embodiments, stereo camera lens alignment designed to enable natural depth of 3D videos. For spherical lenses, sometimes even one degree of deviation from parallel can cause reduced depth in the video. Therefore, rigorous active alignment process in the manufacturing process is performed in order to reduce misalignments below, e.g., 3 um.

In some embodiments, the distance between the lenses in the camera device (also referred to as the intra-axial distance) is about the distance between a person's eyes (also referred to as the intra-ocular distance) and can be about 6.35 cm. A longer base line (e.g., greater inter-camera distance) produces a more extreme 3-dimensionality effect. For example, an intra-axial distance can be 6.3 cm, as it matches to a larger population of female and males.

Figure 4:
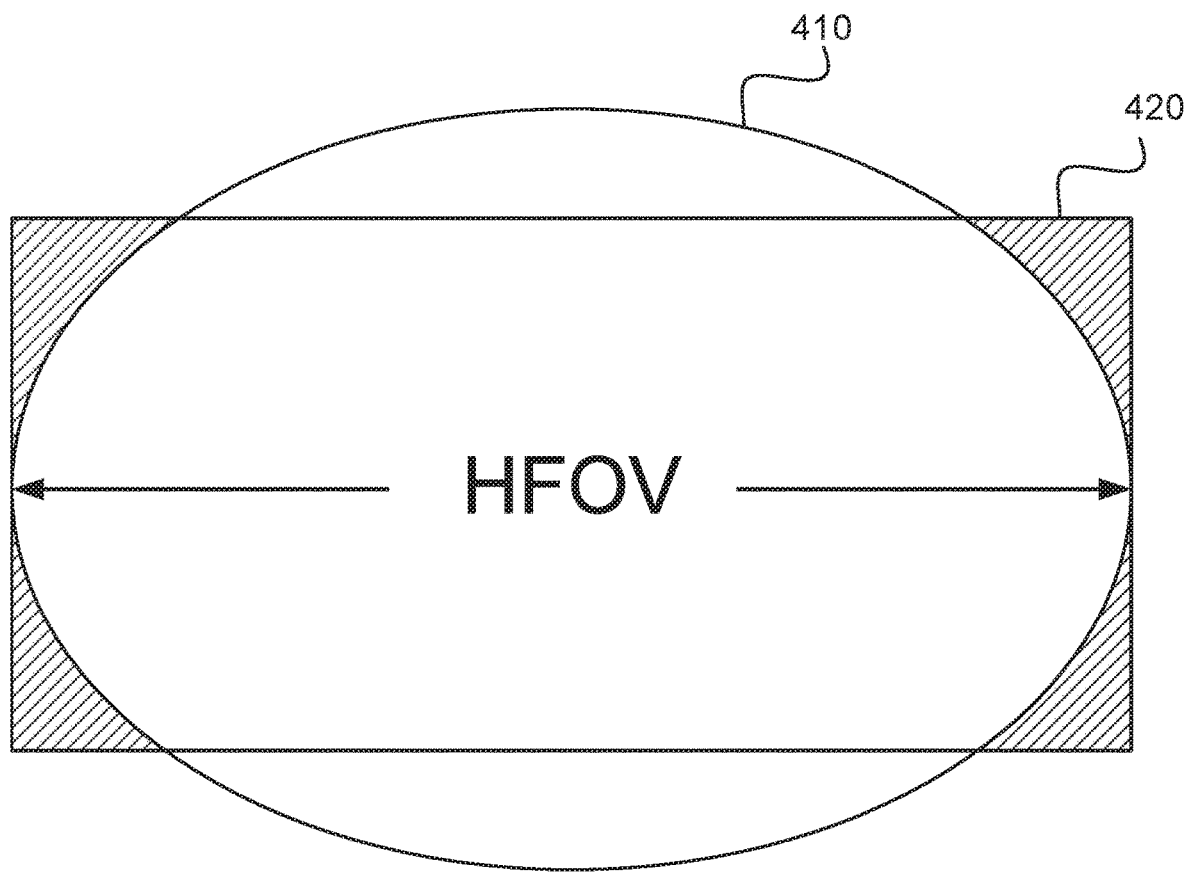
FIG. 4 shows a comparison of an image circle and an image sensor area.

FIG. 4 shows a comparison of an image circle and an image sensor area. In some embodiments, to achieve a good output quality of a camera for a wide field of view (e.g., 180°), the diameter of the image circle 410 can be equal to a length of the image sensor 420 of the camera module. This way, the range of field of view is optimized to around 180°, mimicking the peripheral of a human eye and the vertical limitations similar to the iris. The camera thus produces the same vision as a human eye would create. This enables recreating exactly the experience a scene in way as a person sees the scene using his or her own eyes.

Modular Design of Stereoscopic Device

Figure 5:
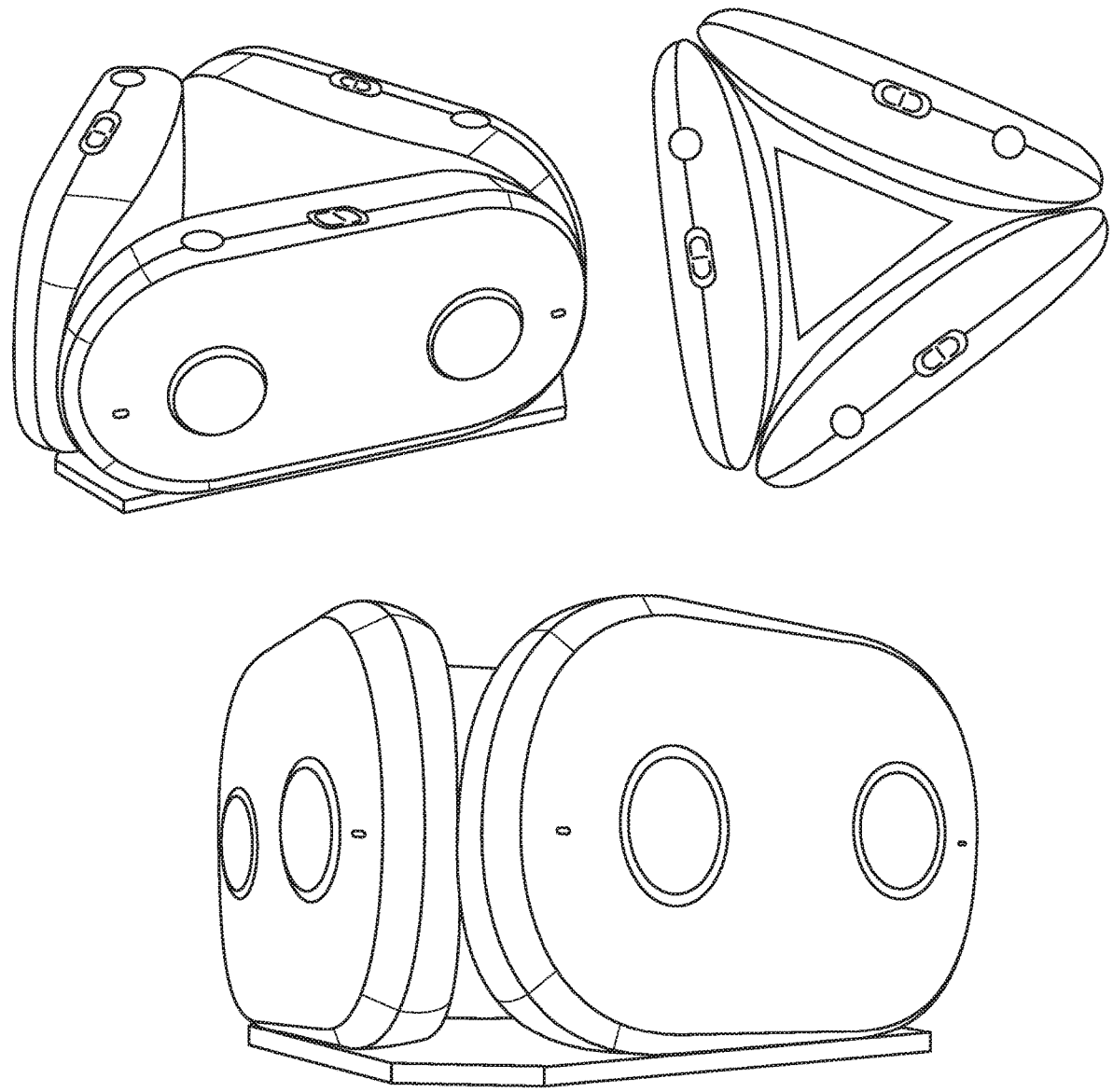
FIG. 5 shows different perspective views of multiple stereoscopic devices that are combined in a triangle to capture 360° 3D videos.

The modular design of the stereoscopic device enables many applications in the VR and augmented reality (AR) space. As shown in FIG. 5, multiple stereoscopic devices can be combined in a triangle to capture 360° 3D videos by stitching the edges, where a 30° image overlap occurs.

Figure 6:
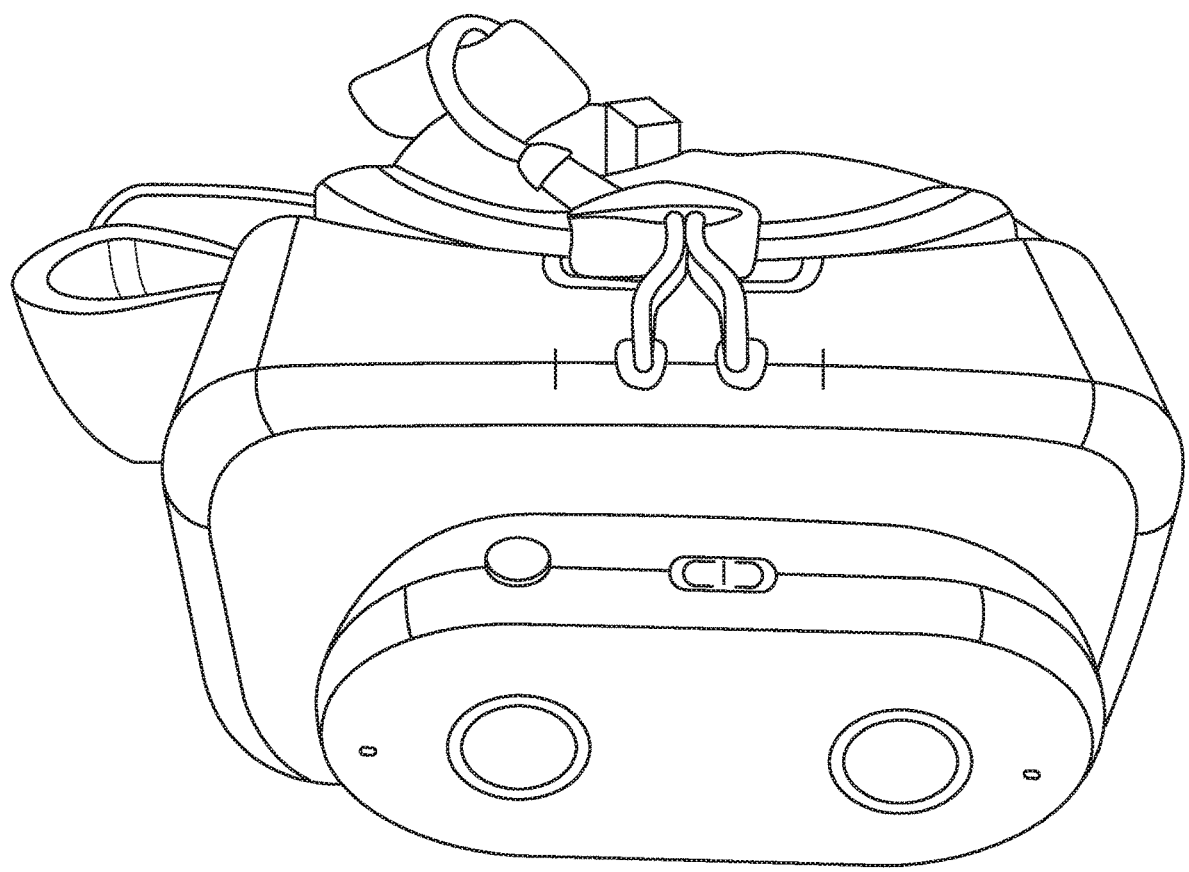
FIG. 6 shows a stereoscopic device that can be mounted in front of another virtual reality head set to form an AR headset.

In some embodiments, as shown in FIG. 6, a stereoscopic device as disclosed herein can be mounted in front of another virtual reality head set (e.g., an Oculus Rift) to form an AR headset by using the lenses of the stereoscopic device to watch through the AR headset. Such an AR headset enables developers to model 3D objects or overlays on top of the image stream that is created by the camera.

Mountable Stereoscopic Device

Figure 7:
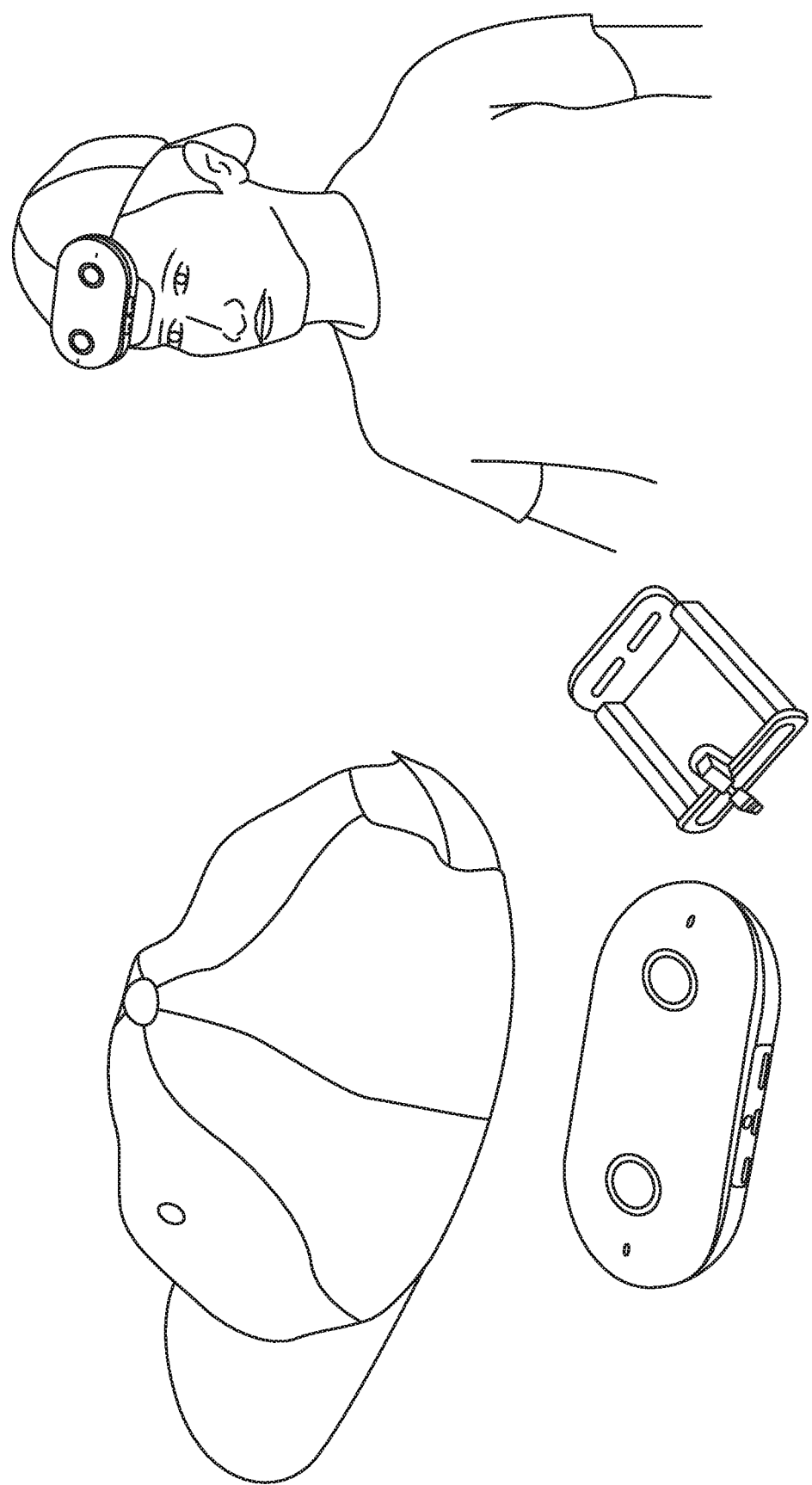
FIG. 7 shows a stereoscopic device that can be mounted in on user's head.
Figure 8:
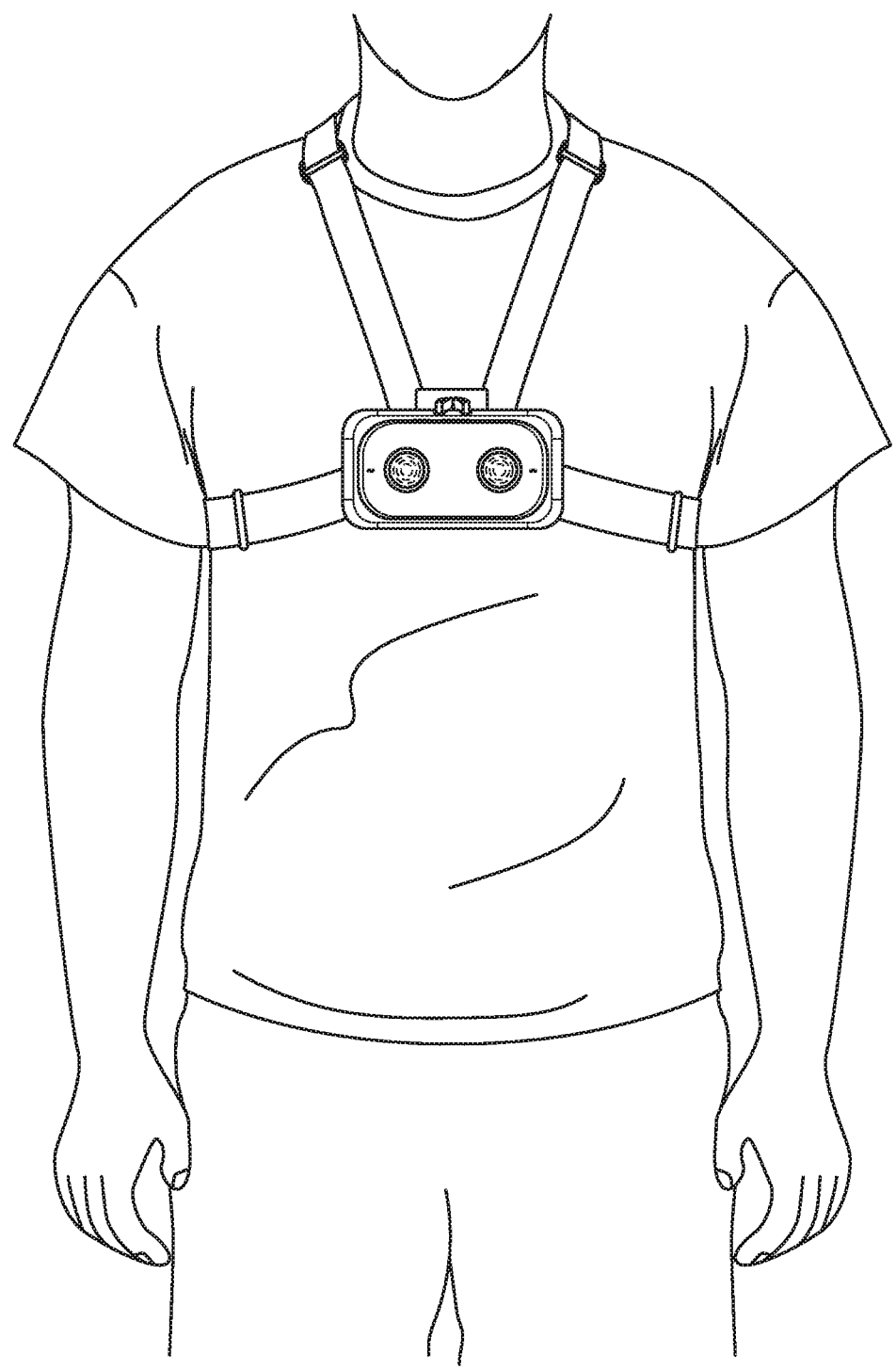
FIG. 8 shows a stereoscopic device that can be mounted in on user's chest.

In some embodiments, the stereoscopic device is designed in a shape similar to the size of a smart phone. Such a shape enables the stereoscopic device to be mounted with any mobile phone clip. Thus, the mobile phone clip allows mounting the stereoscopic device on a user's head with a cappy as shown in FIG. 7, or on a user's chest with a strip as shown in FIG. 8. Because of the versatile design of the stereoscopic device, the device can be mounted on any body part of a user.

Dongle Device

Figure 9:
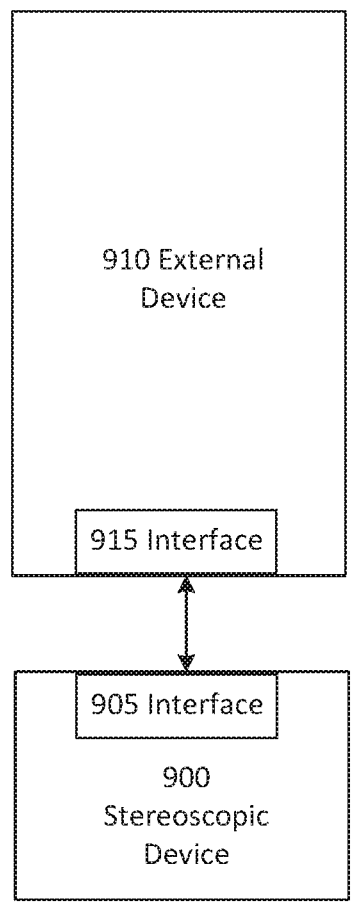
FIG. 9 shows a sample stereoscopic device that can be implemented as a dongle of an external device.
Figure 10:
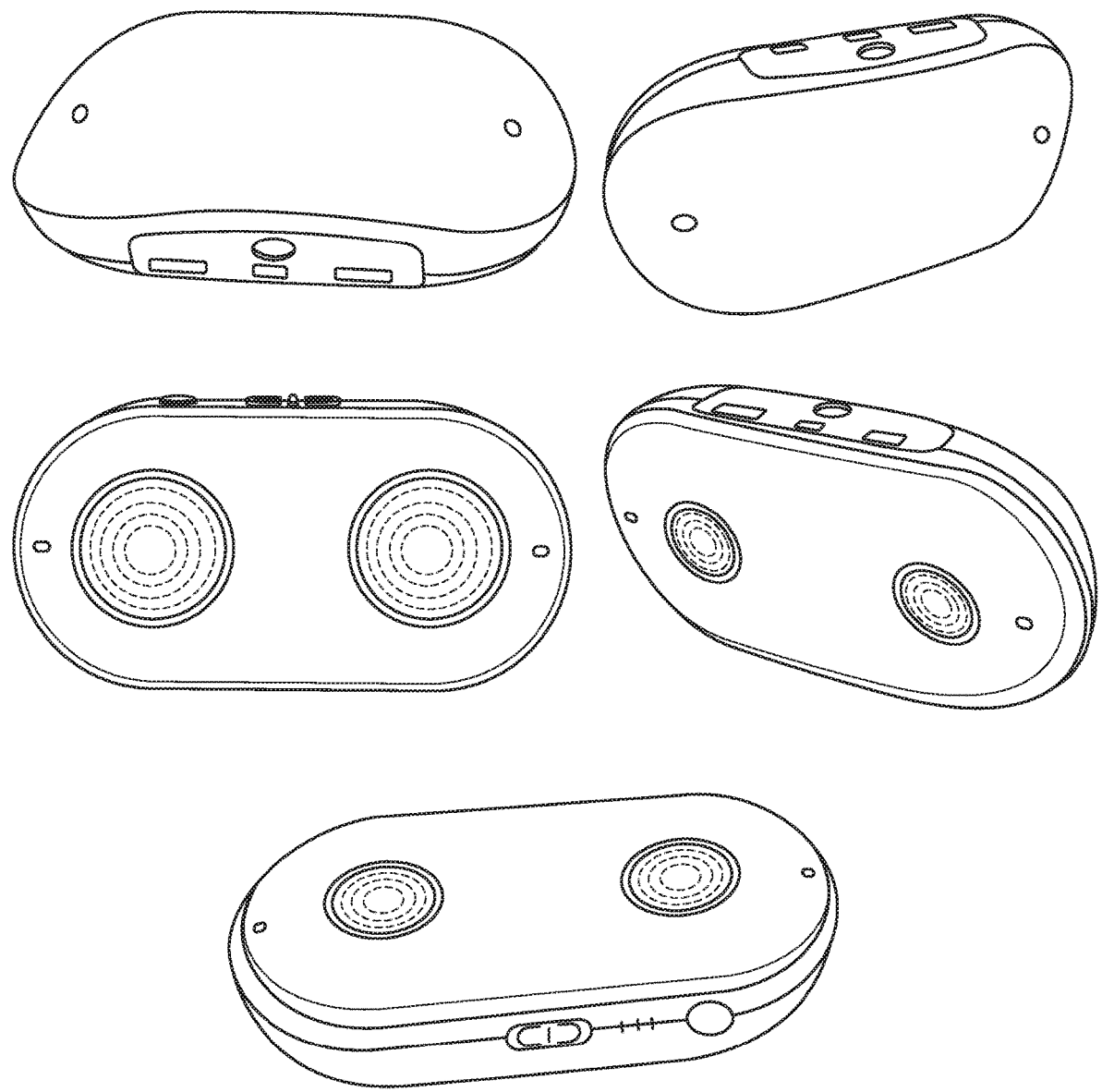
FIG. 10 shows a stereoscopic device, from different perspectives.
Figure 11:
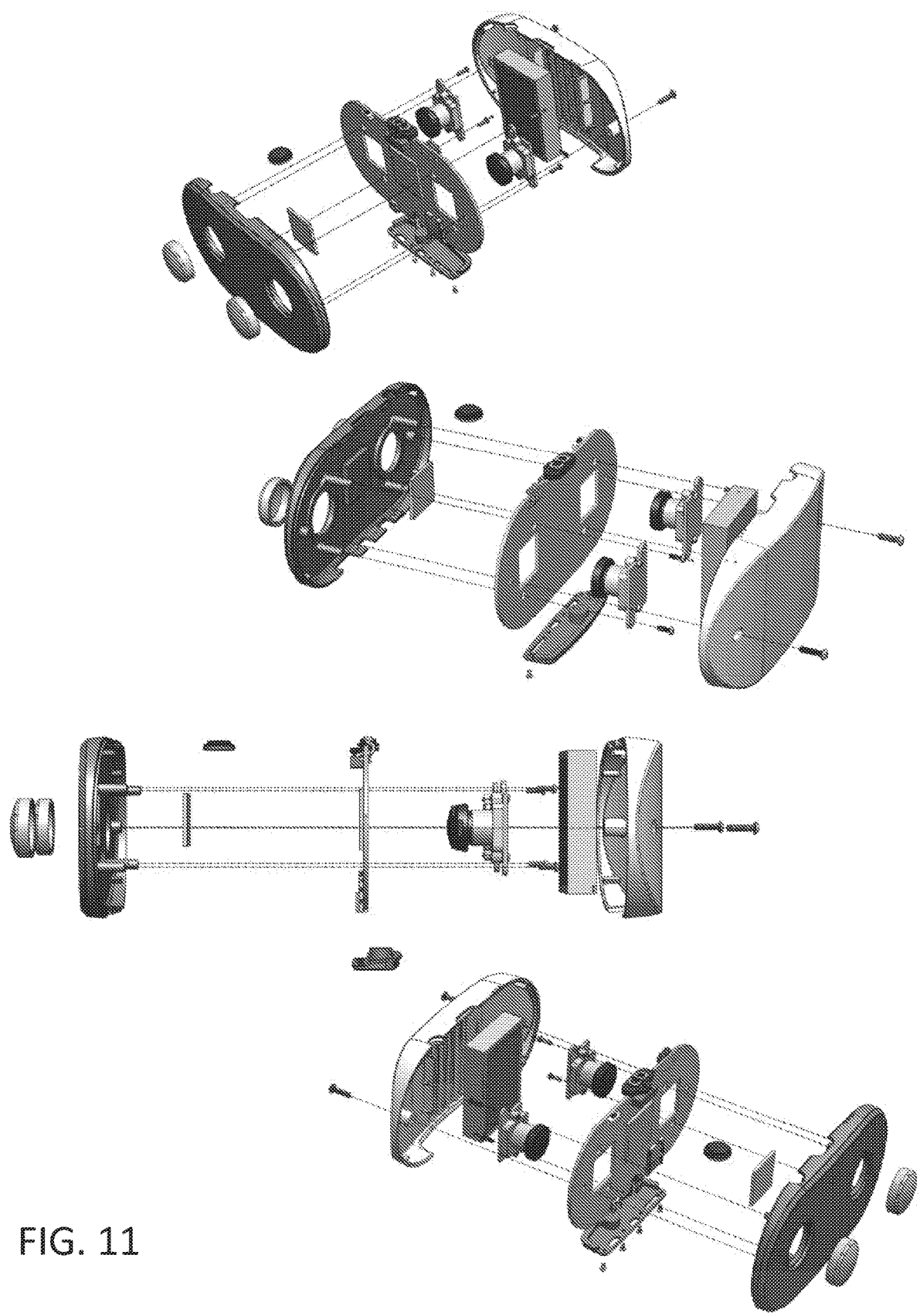
FIG. 11 shows exploded views of components of a stereoscopic device, from different perspectives.

In some embodiments, instead of a standalone device, the stereoscopic device can be implemented as a dongle for another device. FIG. 9 shows a sample stereoscopic device 900 implemented as a dongle of an external device 910. The external device 910 can be, e.g., a laptop computer, a desktop computer, a tablet computer, a smart phone, a video game console, etc.

The stereoscopic device 900 includes an interface 905 for connecting the stereoscopic device 900 to the interface 915 of the external device 910. The interface 905 can be any types of interface that enable data communication between the stereoscopic device 900 and the external device 910. For example, the interface 915 can be, e.g., a USB interface, a lightening interface, an HDMI interface, etc.

In some embodiments, the stereoscopic device 900 can send the 3D video files to the external device 910 so that the external device 910 can play back the 3D video to recreate a virtual reality experience.

In some embodiments, the stereoscopic device 900 does not need to include an internal battery and draws electrical power from the external device 910 via the interface 905. The stereoscopic device 900 may utilize the processing power of the external device 910. In other words, the stereoscopic device 900 may not need the CPU or even GPU for processing the 3D video data. In some embodiments, the stereoscopic device 900 still retains a GPU for a faster processing speed.

In some embodiments, the stereoscopic device 900 does not include any storage space and uses the storage space of the external device 910 for storing the 3D video files or 3D image files.

In some embodiments, the stereoscopic device 900 can be implemented as a case (e.g., a mobile phone case) for the external device 910. The stereoscopic device 900 has a shape designed to attach to, support, or hold the external device 910.

Conversion Between 3D and 2D

In some embodiments, the playback device can convert 2D images or videos into 3D images or videos, or convert 3D images or videos into 2D images or videos. In that way, the user can still use a virtual reality device to experience the VR effect based on images or videos that are originally recorded in 2D.

Sample Hardware Architecture

Figure 12:
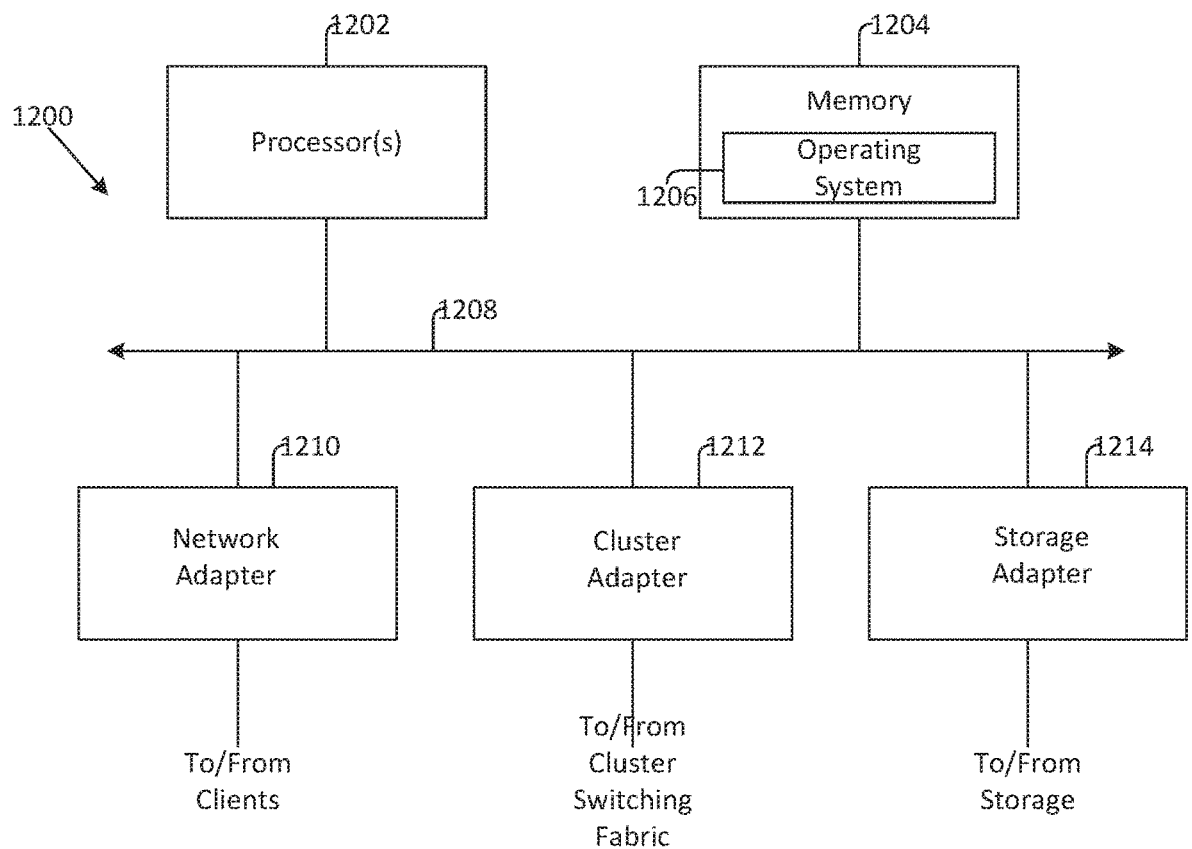
FIG. 12 is a high-level block diagram illustrating an example of a hardware architecture of a computing device that performs disclosed functionalities, in various embodiments.

FIG. 12 is a high-level block diagram illustrating an example of a hardware architecture of a computing device 1200 that performs the above process, in various embodiments. The computing device 1200 executes some or all of the processor executable process steps that are described below in detail. In various embodiments, the computing device 1200 includes a processor subsystem that includes one or more processors 1202. Processor 1202 may be or may include, one or more programmable general-purpose or special-purpose microprocessors, digital signal processors (DSPs), programmable controllers, application specific integrated circuits (ASICs), programmable logic devices (PLDs), or the like, or a combination of such hardware based devices.

The computing device 1200 can further include a memory 1204, a network adapter 1210, a cluster access adapter 1212 and a storage adapter 1214, all interconnected by an interconnect 1208. Interconnect 1208 may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (19E) standard 1394 bus (sometimes referred to as "Firewire") or any other data communication system.

The cluster access adapter 1212 includes one or more ports adapted to couple the computing device 1200 to other devices. In the illustrated embodiment, Ethernet can be used as the clustering protocol and interconnect media, although other types of protocols and interconnects may be utilized within the cluster architecture described herein.

The computing device 1200 can be embodied as a single- or multi-processor system executing an operating system 1206 that can implement a high-level module, e.g., a manager, to logically organize the information as a hierarchical structure of named directories, files and special types of files called virtual disks at the storage devices. The computing device 1200 can further include graphical processing unit(s) for graphical processing tasks or processing non-graphical tasks in parallel.

The memory 1204 can comprise storage locations that are addressable by the processor(s) 1202 and adapters 1210, 1212, and 1214 for storing processor executable code and data structures. The processor 1202 and adapters 1210, 1212, and 1214 may, in turn, comprise processing elements and/or logic circuitry configured to execute the software code and manipulate the data structures. The operating system 1206, portions of which are typically resident in memory and executed by the processor(s) 1202, functionally organizes the computing device 1200 by (among other things) configuring the processor(s) 1202 to invoke. It will be apparent to those skilled in the art that other processing and memory implementations, including various computer readable storage media, may be used for storing and executing program instructions pertaining to the technology.

The network adapter 1210 can include multiple ports to couple the computing device 1200 to one or more clients over point-to-point links, wide area networks, virtual private networks implemented over a public network (e.g., the Internet) or a shared local area network. The network adapter 1210 thus can include the mechanical, electrical and signaling circuitry needed to connect the computing device 1200 to the network. Illustratively, the network can be embodied as an Ethernet network or a Fibre Channel (FC) network. A client can communicate with the computing device over the network by exchanging discrete frames or packets of data according to pre-defined protocols, e.g., TCP/IP.

The storage adapter 1214 can cooperate with the operating system 1206 to access information requested by a client. The information may be stored on any type of attached array of writable storage media, e.g., magnetic disk or tape, optical disk (e.g., CD-ROM or DVD), flash memory, solid-state disk (SSD), electronic random access memory (RAM), micro-electro mechanical and/or any other similar media adapted to store information, including data and parity information. The storage adapter 1214 can include multiple ports having input/output (I/O) interface circuitry that couples to the disks over an I/O interconnect arrangement, e.g., a conventional high-performance, Fibre Channel (FC) link topology. In various embodiments, the cluster adapter 1212 and the storage adapter 1214 can be implemented as one adapter configured to connect to a switching fabric, e.g., a storage network switch, in order to communicate with other devices and the mass storage devices.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above, are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for mapping stereoscopic data from a three-dimensional space to a two-dimensional space and filtering motion data, comprising: obtaining a video stream from a stereoscopic camera that captures stereoscopic video streams, parameters representing a field of view of the stereoscopic camera, and parameters representing a setting of a lens or sensor of the stereoscopic camera; identifying a reference frame, a first set of frames before the reference frame, and a second set of frames after the reference frame from the video stream; comparing the first and second set of frames to characterize a first motion; filtering the first motion to generate a filtered motion, the filtered motion having a value corresponding to the reference frame; calculating a first matrix based on the filtered motion; calculating a second matrix representing a mapping from a three-dimensional space to a two-dimensional space associated with a plane of the stereoscopic camera in the absence of motion, wherein the second matrix is calculated using at least one of a focal length of the stereoscopic camera at a time the reference frame was captured and a principal point of the stereoscopic camera, wherein a respective item of intrinsic data in the three-dimensional space is estimated for each of the first and second set of frames; calculating a third matrix as an inverse of the first matrix; and applying the first matrix, second matrix, and third matrix together in a matrix operation to the reference frame to obtain a modified reference frame.

2. The method of claim 1, wherein the method is applied on a plurality of reference frames, a corresponding set of frames before each of the plurality of reference frames, and a corresponding set of frames after each of the plurality of reference frames.

3. The method of claim 1, wherein the method is applied on a plurality of stereoscopic cameras.

4. The method of claim 1, wherein the method is applied on two stereoscopic cameras that independently capture left and right channels of a stereoscopic 30 video.

5. A method for video playback, comprising: obtaining a reference frame, a first set of frames before the reference frame, and a second set of frames after the reference frame from a camera wherein the camera is a stereoscopic camera that captures stereoscopic video streams; corn paring the first and second set of frames to characterize a first motion; filtering the first motion to generate a filtered motion, the filtered motion having a value corresponding to the reference frame; calculating a first matrix representing a mapping from a three-dimensional space to a two-dimensional space associated with a plane of the camera in the absence of motion, a second matrix as an inverse of the image's first matrix, and a third matrix relating to the filtered motion, wherein the first matrix is calculated using at least one of a focal length of the camera at a time the selected image was captured and a principal-point of the camera; and applying the first matrix, second matrix, and third matrix together in a matrix operation to the reference frame to obtain a modified reference frame.

6. The method of claim 5, wherein the method is applied on a plurality of reference frames, a corresponding set of frames before each of the plurality of reference frames, and a corresponding set of frames after each of the plurality of reference frames.

7. The method of claim 5, wherein the camera further captures parameters representing a field of view of the camera.

8. The method of claim 5, wherein the camera can further capture parameters representing a setting of a lens or sensor assembly of the camera.

9. The method of claim 5, wherein the camera includes an image sensor and lens.

10. The method of claim 5, wherein two cameras independently capture left and right channels of the stereoscopic 3D video.

11. The method of claim 5, wherein the plurality of cameras are configured with different exposure levels, white balances and/or color contrasts for high dynamic range (HDR) optimization.

* * * * *